May 17, 1960

C. E. GRIMES 2,936,561

GANG MOWER ASSEMBLY FOR UTILITY TRACTORS

Filed Sept. 9, 1958

INVENTOR
CHARLES E. GRIMES
BY
Williamson, Schroeder & Palmatier
ATTORNEYS

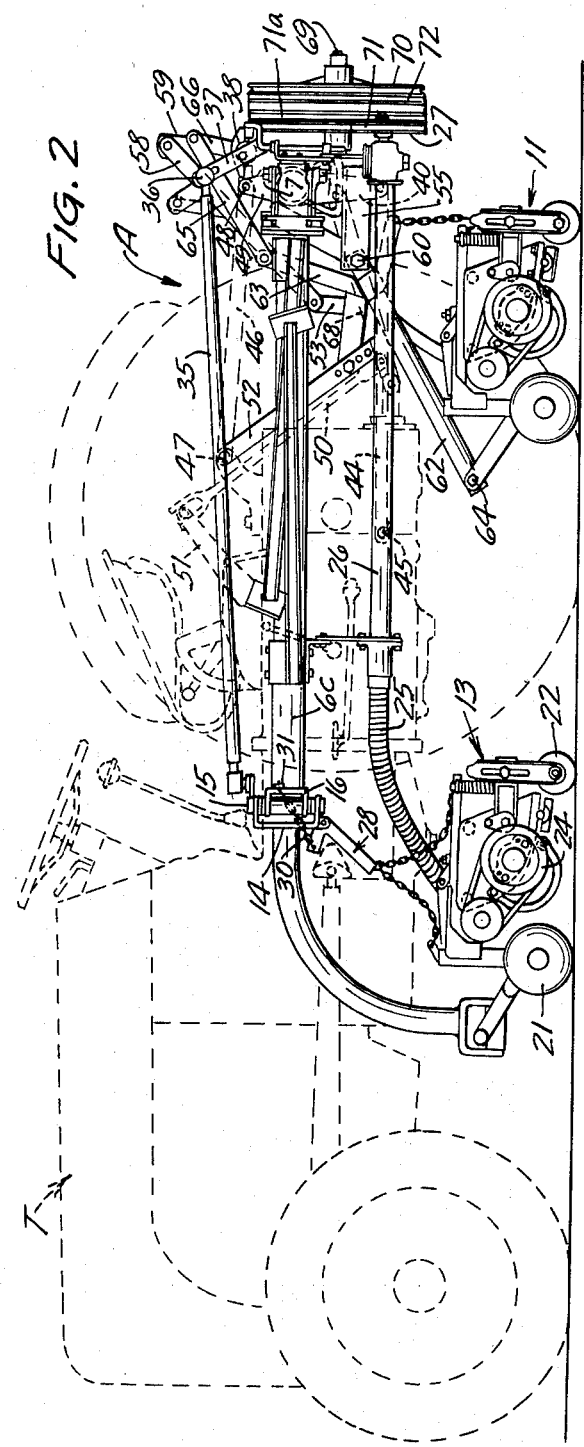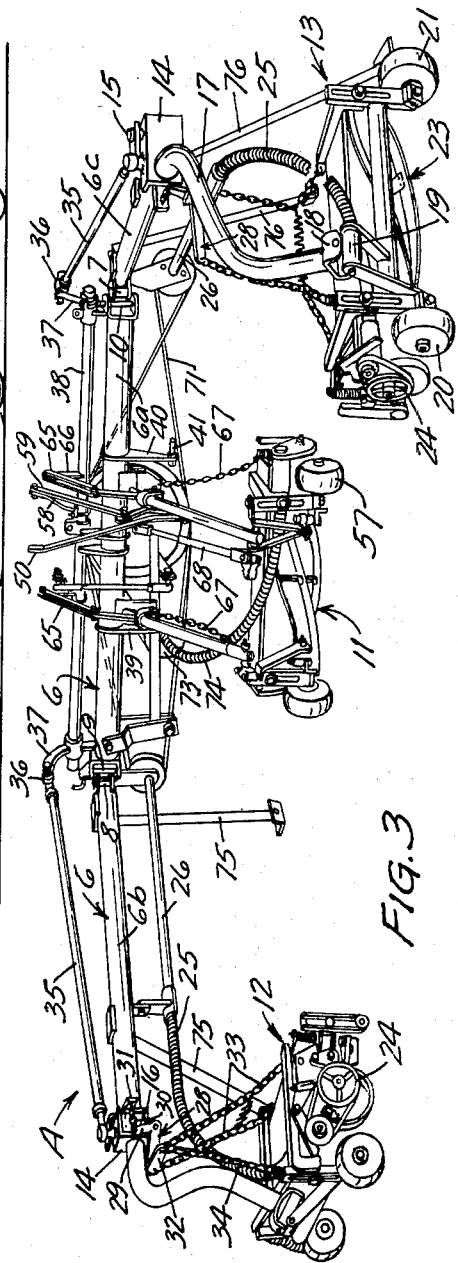
INVENTOR
CHARLES E. GRIMES
BY Williamson, Schroeder, & Palmatier
ATTORNEYS May 17, 1960

C. E. GRIMES 2,936,561

GANG MOWER ASSEMBLY FOR UTILITY TRACTORS

Filed Sept. 9, 1958

INVENTOR
CHARLES E. GRIMES
BY Williamson, Schroeder & Palmatier
ATTORNEYS

United States Patent Office 2,936,561
Patented May 17, 1960

2,936,561

GANG MOWER ASSEMBLY FOR UTILITY TRACTORS

Charles E. Grimes, Minneapolis, Minn., assignor to Toro Manufacturing Corporation, Minneapolis, Minn., a corporation of Minnesota Application September 9, 1958, Serial No. 759,943

15 Claims. (Cl. 56—7)

This invention relates to gang mower assemblies. More particularly, it relates to gang mower assemblies adapted to be mounted upon a tractor for propelling thereby in order to traverse the ground, the assembly preferably being capable of quick and ready attachment and detachment relative to the tractor and being usable with tractors of the "utility" type which are so constructed as to have low silhouette.

It is a general object of my invention to provide a novel gang mower assembly capable of quick and simple attachment or detachment to a tractor and usable with a tractor having a low silhouette.

A more specific object is to provide a gang mower assembly which may be mounted upon a utility type tractor and may be raised and lowered relative to the frame of the tractor without damage to either the tractor or the mower assembly.

Another object is to provide a novel gang mower assembly capable of being mounted upon a utility type tractor and of being attached to or detached from such a tractor in the most simple and quick manner possible.

Another object is to provide a novel gang mower assembly which will surround the outline of the tractor to which it is attached and which is capable of having the portions thereof which extend along the side of the tractor swing outwardly in order to facilitate detachment from the tractor.

Another object is to provide a novel gang mower assembly capable of being utilized on a low silhouette utility type tractor with its forward moving units disposed directly ahead of the rear wheels of the tractor.

Another object is to provide a gang mower assembly capable of being attached to a tractor in such a manner that each of the mowing units thereon will be driven by the power take off of the tractor, including those disposed ahead of the rear wheels of the tractor.

Another object is to provide a novel gang mower assembly for use in combination with a low silhouette utility type tractor and which is constructed and arranged to have mowing units disposed immediately ahead of the rear wheels of the tractor, these mowing units being so constructed and actuated by the remainder of the assembly as to cause them to shift forwardly and outwardly when elevated so as not to engage the tires of the rear wheels or the running board or other parts of the tractor during such elevation and to shift rearwardly and inwardly when lowered to a position directly in front of the rear wheels of the tractor and within the vertical confines of the rear wheel of the tractor.

Another object is to provide a novel gang mower assembly capable of being connected to a tractor in such a manner that the three point hitch of the tractor and its hydraulic lift constitutes the sole means of attaching the assembly to the tractor and for elevating and lowering the assembly.

These and other objects and advantages of my invention will more fully appear from the following description made in connection with the accompanying drawings, wherein like reference characters refer to the same or similar parts throughout the several views and in which:

Fig. 2 is a side elevational view of the same embodiment with the tractor again shown in phantom by means of broken lines in order to more clearly show the construction of the mower assembly;

Fig. 3 is a perspective view of my gang mower assembly shown detached from the tractor and with its forwardly extending legs spread to facilitate attachment of the tractor to the assembly;

The purpose of my invention is to provide a readily attachable and detachable mowing assembly utilizing a plurality of separate mowing units and usable with tractors having a low silhouette. Many tractors which are commonly termed "utility tractors" have very low silhouettes and most gang mower constructions as known today are constructed in such a manner that they cannot be utilized in combination with a utility type tractor. Many organizations own such type of tractors and also have need for gang mowers, but because of the low silhouette characteristic of their tractors, they have been unable to utilize the gang mowing assemblies available on the market. Most such gang mowing units for tractors are constructed for use with tractors having a higher silhouette and these mowing assemblies will not work on the low silhouette type tractors (such as the Ferguson type) because there is insufficient clearance provided by the body of the tractor to permit the mower units to operate properly or to be raised and lowered as required. These assemblies must be constructed so that the forward mowing units mow directly ahead of the big rear wheels of the tractor and so that a third and rear unit may trail behind the rear wheels so as to overlap the area between the two front mowing units. The low silhouettes of the utility type tractors prevents the elevation and lowering of the mowing units of the conventional gang mower assembly when they are positioned ahead of the rear wheels of the tractors.

Thus it can be seen that my invention is designed to eliminate the need for two separate tractors in the event the owner desires to have a gang mower assembly and also a utility tractor.

Figure 1:
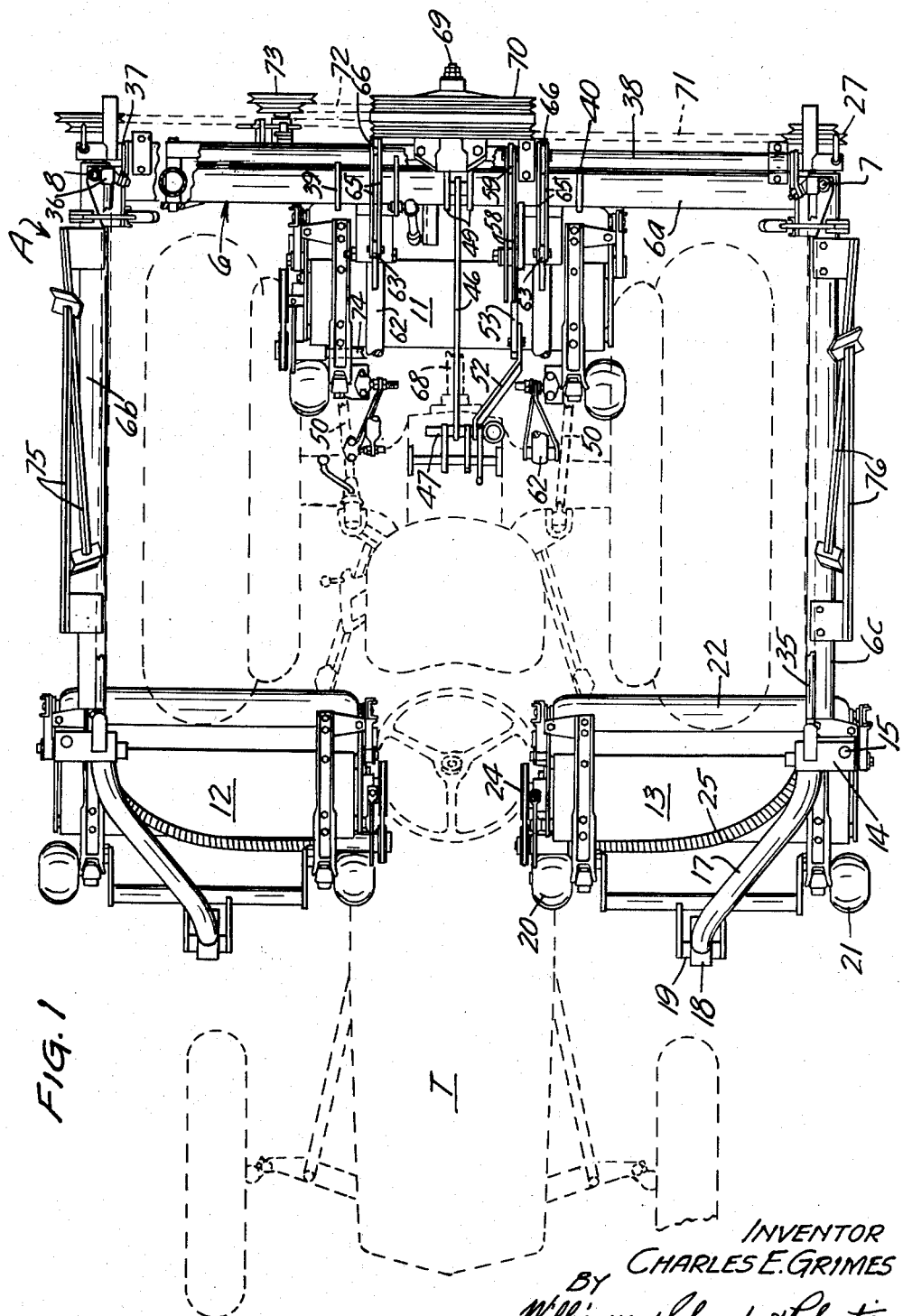
Fig. 1 is a plan view of one embodiment of my invention mounted upon a tractor with the tractor shown in phantom.

One embodiment of my invention may include as shown in Figs. 1–5 a gang mower assembly indicated generally by the letter A which is removably mounted upon a tractor indicated by the letter T which has a low silhouette. As shown, the assembly A is comprised of a U-shaped frame indicated generally by the numeral 6 and having a base portion 6a and a pair of legs 6b and 6c. The base portion 6a when connected to the tractor extends transversely thereof and therebehind and the legs 6b and 6c of the frame extend forwardly therefrom and along the sides of the tractor as best shown in Figs. 1 and 2. It will be noted that the legs 6b and 6c are pivotally secured to the base portion 6a of the frame 6 at opposite ends of the base portion so as to pivot about a vertical axis defined by pivot pins 7 and 8. These legs 6b and 6c are thus capable of swinging outwardly relative to the tractor and laterally to the extended positions shown in Fig. 3 after the locking pins 9 and 10 have been removed to permit such swinging movement. When the legs 6b and 6c are moved to a parallel position to extend along the sides of the tractor as shown in Fig.

1, these pins 9 and 10 are replaced to lock the legs 6b and 6c in such position. It will be noted that the base leg 6a carries a mowing unit indicated generally by the numeral 11 while the leg 6b carries a smilar mowing unit indicated by the numeral 12 and the leg 6c carries a similar unit indicated by the numeral 13. These units 11, 12 and 13 are propelled by the frame 6 when the frame is secured to the tractor and are elevated and lowered by the frame 6 when the latter is caused to be raised or lowered by the tractor as hereinafter described. The cutting mechanism of each of these mowing units 11, 12 and 13 is prapelled by a drive mechanism which is connected to the power take off of the tractor as will be hereinafter described.

Each of the front mowing units 12 and 13 is mounted upon the forward ends of the respective legs 6b and 6c in identical manner so as to cause the mowing units to swing forwardly and outwardly when the mowing assembly A is elevated and to swing inwardly and rearwardly when the assembly is lowered. For the sake of brevity the mowing unit 13 will be described in detail with the understanding that the mowing unit 12 is of similar structure.

As best shown in Figs. 2 and 3, the mowing unit 13 is pivotally mounted upon the forward end of the leg 6c through the use of a U-shaped mounting bracket 14 and a vertically extending pivot pin 15, the latter of which is carried within a forwardly facing U-shaped bracket 16 at the end of the leg 6c. Through this connection, the entire unit is supported by the frame 6, including the arm 17 which extends forwardly and then inwardly and then forwardly as well as downwardly as best shown in Fig. 3 relative to the bracket 14. Reference to Fig. 3 will show that the bracket 14 is of considerable length when considered transversely of the leg 6c and will show that the pivot pin 15 is adjacent one end thereof while the arm 17 is disposed adjacent the opposite end thereof.

The mounting arm 17 serves to draw the mowing unit 13 across the terrain and is connected to the frame of the mower by a downwardly facing bracket 18 which is pivotally connected to a horizontal pivot 19 which in turn is pivotally connected to the frame of the mowing unit. Thus the frame of the mowing unit is capable of pivot about a horizontal, transverse axis and also about an upwardly inclined axis which extends in a vertical plane parallel to the vertical plane of the leg 6c. A pair of wheels 20 and 21 designed to substantially eliminate scuffing support the front corners of the mowing unit 13 while a roller 22 supports the rear end of the unit. The unit 13 has a reel type cutting mechanism indicated generally by the numeral 23 and this mechanism is driven by means of a pulley and belt arrangement indicated generally by the numeral 24 which in turn is propelled by means of a flexible cable 25 that extends rearwardly through a rigid tube 26 and terminates with a sheave 27 which is mounted upon the leg 6c and swings therewith. The sheave 27 extends in a vertical plane transverse relative to the frame of the tractor when the assembly A is connected thereto in operating position.

Pivotally mounted on the bracket 14 for swinging movement about a horizontal axis extending transversely of the bracket 14 is a bell crank 28. One arm 29 of the bell crank is anchored by a chain 30 to an anchoring lug 31 as best shown in Fig. 3 relative to the mowing assembly 12. A transverse arm 32 is mounted upon the other arm of the bell crank and supports a plurality of chains indicated by the numeral 33. It will be noted that when the bracket 14 pivots outwardly about the pivot pin 15 the mounting arm 17 will necessarily move forwardly and laterally outwardly, carrying with it the bell crank 28. Since the upper end of the arm 29 of the bell crank is anchored, this will cause the bell crank to pivot and elevate the arm 32 causing it to swing upwardly and rearwardly. Such upward and rearward movement causes the chains 33 and 34 which are connected to the mowing unit to be pulled taut and thereby compel the mowing unit to follow the frame 6 in upward movement as the frame is raised.

Each of the brackets 14 is pivotally connected at its end opposite the end through which the pivot pin 15 extends to a shift rod 35 which extends longitudinally of the leg and rearwardly to a point adjacent the base portion 6a. The shift rod 35 is pivotally connected at its opposite end as at 36 to a torque arm 37 which extends upwardly from a torque tube or shaft 38. The torque arm 37 is fixedly secured to the torque tube 38 so as to rotate therewith when the torque tube is turned about its longitudinal axis. Thus when the torque tube 38 is caused to rotate about its longitudinal axis, the torque arm 37 will force the shift rod 35 to move the bracket 14 forwardly and outwardly or rearwardly and inwardly as the case may be about the pivot pin 15 and simultaneously, carry the mowing unit supported thereby with it in the same directions. For example, when the shift rod 35 moves forwardly, the bracket 14 will pivot about the pivot pin 15 and swing its opposite end forwardly and outwardly, thereby causing the mowing unit to swing forwardly and outwardly relatively to the wheel of the tractor. Likewise, when the shift rod 35 is pulled rearwardly through rotation of the torque tube 38, the free end of the bracket 14 will be drawn inwardly and rearwardly and the mowing unit supported thereby will be likewise moved in the same direction. The inward and rearward movement of the support arm 17 and the bracket 14 will permit the bell crank 28 to turn in such a manner as to release the chains 33 and 34, thereby permitting the mowing unit to be supported by the wheels 20 and 21 and the roller 22.

Figure 4:
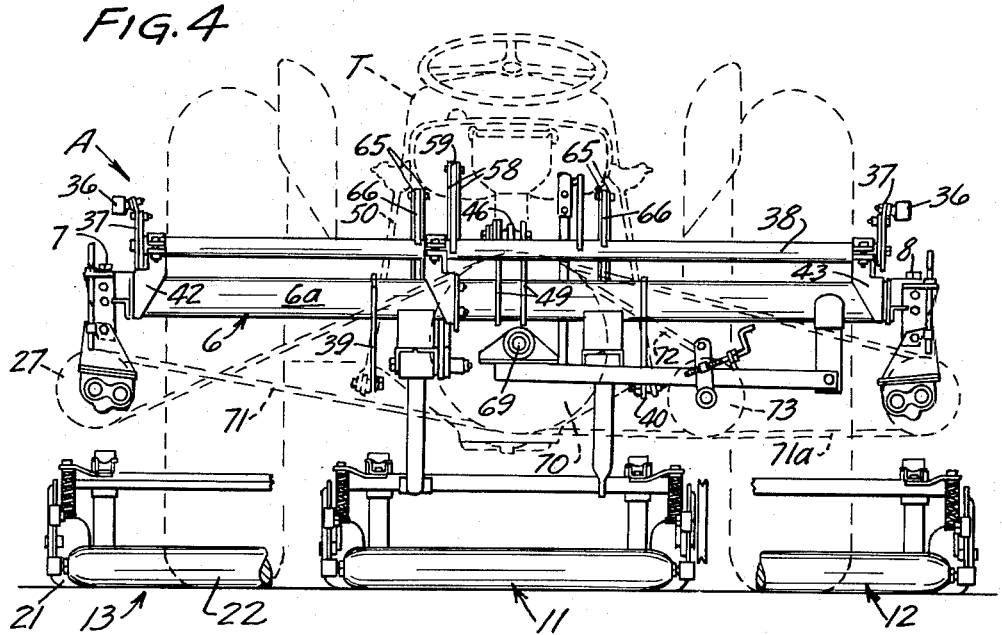
Fig. 4 is a rear elevational view of my invention mounted upon a tractor, the tractor again being shown in phantom by broken lines.

The base portion 6a of the frame 6 has a pair of depending brackets 39 and 40 fixedly secured thereto and extending downwardly therefrom. Each of these brackets is provided with a laterally extending pivot pin such as 41 which extends outwardly from the lower end of the bracket. At opposite ends of the base portion 6a there is also provided a pair of mounting brackets 42 and 43 which pivotally mount the torque tube 38 as best shown in Fig. 4.

Figure 5:
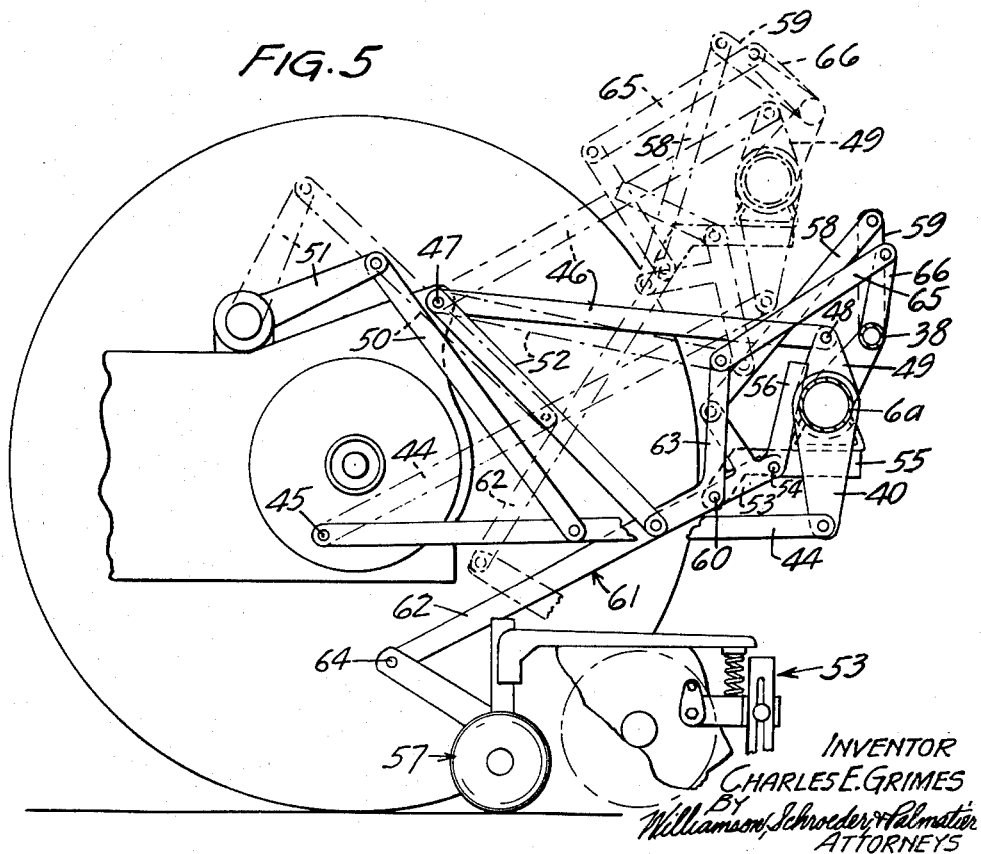
Fig. 5 is a vertical sectional view showing the elevating and shifting linkage in elevation in order to more clearly understand the operation of the assembly.

Pivotally mounted upon each of the pivot pins 41 at the lower ends of the brackets 40 is a link such as is indicated by the numeral 44 in Fig. 5 which extends forwardly and is pivotally secured to the frame of the tractor at opposite sides of the frame of the tractor as indicated by the numeral 45. This pair of links 44 constitutes the lower legs of a parallelogram connection between the tractor and the base portion 6a of the frame 6. The upper leg of the parallelogram is comprised of a single link 46 which is pivotally connected to the tractor at 47 immediately behind the seat of the tractor and extends rearwardly from that point and is pivotally secured at 48 to an upstanding bracket 49 which is rigidly secured to the base portion 6a. The forward side of the parallelogram connection is comprised, of course, by the frame of the tractor and the rearward leg is comprised of the bracket 49, the base portion 6a and the brackets 39 and 40. Pivotally secured to the medial portion of the link 44 is a lift arm 50 which has its upper end secured to the hydraulic lift 51 of the tractor. Thus, when the hydraulic lift 51 moves to the broken line position shown in Fig. 5, the parallelogram connection described above will shift to the broken line position shown in Fig. 5 and will lift the base portion 6a and the remainder of the frame 6 therewith. Hence, it can be seen that I have utilized the three point hitch of the tractor as the sole supporting means for the entire frame and the mowing units secured thereto and have taken advantage thereby of its inherent features of quick attachment and detachment.

Rotation of the torque tube 38 and the consequent shifting of the shift rod 35 and the outward and forward swinging of the mowing units disposed ahead of the rear wheels of the tractor is accomplished by means of a linkage mechanism extending between the torque arm and the tractor. The point of connection at the forward end of this linkage is the same as that at which the upper leg 46 of the parallelogram is secured to the tractor, indicated by the numeral 47. This mechanism is comprised of a rigid link 52 pivotally secured at its upper end at the point 47 to the tractor and pivotally secured at its lower end to a bell crank 53 which, as shown in Fig. 5, is right angled and is pivoted at 54 upon a pivot block 55 which is welded to the base portion 6a at its under side. Rigidly secured to the bell crank 53 at its point of pivot is an abutment member 56 which bears against the base portion 6a to prevent the frame 6 from dropping any lower than the position shown in Fig. 5 when the machine is lowered to operating position. As shown, one arm of the bell crank is pivotally secured to the link 52 and the other arm is pivotally secured at its upper end to a rigid link 58 which in turn is pivotally secured at its upper end to a torque arm 59. As best shown in Fig. 5, this torque arm 59 extends upwardly from the torque tube 38 and is fixedly secured thereto and rotates therewith. When the parallelogram connection moves to the broken line position shown in Fig. 5, this linkage mechanism shifts to the broken line position also shown in that figure. Careful examination of the positions of the respective links shows that the bell crank 53 swings in a counterclockwise direction about its pivot mounting 54, thereby causing the link 58 and the torque arm 59 to be drawn forwardly, the necessary result of which is to cause the torque tube 38 to rotate in a counterclockwise direction as viewed in Fig. 5. It is this linkage which gives the necessary rotation to the torque tube 38 to cause the shift rods 35 to shift forwardly as the frame is lifted by the lift arm 50 and to cause rotation in the opposite direction and consequent rearward shifting of the shift rods 35 when the frame is lowered.

Pivotally mounted on the pivot block 55 at the point 60 is a bell crank indicated generally by the numeral 61 and having arms 62 and 63 the former of which is pivotally connected at 64 to support the forward end of the mowing unit 11 as is shown in Fig. 5. The upper end of the arm 63 is pivotally connected to a rigid link 65 and this link has its upper end pivotally connected to a torque arm 66 which is also fixedly secured to the torque tube 38 for rotation therewith. This linkage will shift to the broken line position shown in Fig. 5 when the frame 6 is lifted, thereby causing the mowing unit 57 to be raised upwardly through the action of the bell crank 61 and the chains indicated by the numeral 67. It should be understood that there is a second pivot block similar to the pivot block 55 and a similar link mechanism as that comprised of the bell crank 61, link 65 and torque arm 66 at the other side of the mowing unit 57 as can be clearly seen in Fig. 3. Thus there is a bell crank arrangement at each side of the mowing unit 57 which cooperatively raises this mowing unit along with the frame 6 as it is elevated by the lift arm of the tractor and the parallelogram connection to the three point hitch of the tractor.

Drive shaft 68 is connected for universal movement at its forward end to the power take-off of the tractor. At the opposite end of the drive shaft 68 it is connected for universal movement with the shaft 69 of a drive wheel 70 which is rotatably mounted upon the base portion 6a of the frame. This drive wheel 70 is of the multiple belt type and carries belts 71, 71a arranged as best shown in Fig. 4 to simultaneously drive the sheave 27 and the corresponding sheave carried at the rear end of the leg 6b as best shown in Fig. 3. In this manner, each of the cutting mechanisms of the two mowing units 12 and 13 are driven by the drive wheel 70. A third belt 72 extends around the drive wheel 70 and in driving relation to a third sheave 73 which is connected by a flexible cable 74 to the cutting mechanism of the rear mowing unit 11.

In this manner, each of the mowing units is driven by the power take-off of the tractor through a drive shaft 68 and the entire mechanism required therefrom moves upwardly and downwardly with the frame 6 and the mowing units supported thereby.

A pair of supports 75 and 76 having flat bases are pivotally secured to the legs 6b and 6c of the frame 6 respectively. When these legs 75 and 76 are swung to depending position, they will support the entire frame 6 upon the ground while the unit is not being utilized.

When the mowing assembly is not being utilized it is parked in the position shown in Fig. 3. To secure the unit to the tractor, the tractor may be easily backed in position for connection of the links 44 to the pivot pins 41 of the brackets 39 and 40. The link 46 may be also secured at the point 47 on the tractor to complete the parallelogram hitch. The lift arm 50 is also connected to the hydraulic lift 51 and the drive shaft 68 is connected to the power take-off of the tractor. It will be noted that the legs 6b and 6c when in stored position as shown in Fig. 3 are swung laterally and in order to complete the connection they must be swung inwardly to a position where they extend parallel to the tractor. To do this, the frame 6 may be lifted by the hydraulic lift and the legs 6b and 6c may then be easily swung inwardly to a position where the mowing units 12 and 13 are positioned directly in front of the wheels of the tractor as shown in Fig. 1. The locking pins 9 and 10 may then be inserted to hold the legs 6b and 6c in this position. The unit is then ready for operation as hereinbefore described wherein the frame 6 may be lowered by operation of the hydraulic lift 51 of the tractor. Attendant with the lowering of the frame 6, the torque arm 38 will rotate in a clockwise direction as viewed in Fig. 5, thereby causing the shift rods 35 to shift rearwardly and swing the mowing units 12 and 13 inwardly and rearwardly to a position directly in front of the wheels of the tractor and slightly therebelow as best shown in Fig. 2. Whenever it is desired to elevate the mowing units 12, 13 and 57, the hydraulic lift may be operated whereupon the linkage attached to the torque arm 38 will cause the latter to rotate in a counterclockwise direction as viewed in Fig. 5 and thereby cause the shift rods 35 to shift forwardly and swing the mowing units 12 and 13 forwardly and outwardly relative to the tractor, thereby avoiding engaging the frame of the low silhouette type tractor.

Detachment of this unit from the tractor is a simple matter, for the pins 9 and 10 may be removed and the legs 6b and 6c swung outwardly while the unit is in elevated position. The legs 75 and 76 may then be swung to depending position and will support the weight of the frame when it is lowered. The drive shaft 68, the hydraulic lift 51 and the three point hitch of the tractor may then be disconnected whereupon the tractor may be driven away. From this it can be seen that the mounting of this unit is extremely simple in that it does not involve or require disassembly of any part of the unit in order to attach or detach the same relative to the tractor.

It will be noted that the link 52 which extends downwardly and rearwardly from the tractor is the actuating link which acts to operate a system of mechanical linkage attached to the frame which accomplishes a number of functions when the frame is elevated by the hydraulic lift 51. This mechanical linkage causes the cutting units to be moved into positions where they will clear the tractor when the machine is lifted to transport position. It also moves the cutting units into operating position when the machine as a whole is lowered into operating position by operation of the tractor's hydraulic system. In addition, it provides a measure of restraint on the forward cutting units so that they will not sway unduly during transport and so that the main frame can perform the function of lifting them from operating position to transport position. This is accomplished by the action of the bell crank 52 and the chains 33 and 34, for this system tends to prevent the forward cutting units from swaying unduly while being transported in elevated position.

It will be noted that the forward cutting units of my assembly are connected to draw bars in such a way that neither of the forward cutting units can have any appreciable motion relative to the tractor about a vertical axis. This allows the cutting units to be placed much closer to the tractor than would otherwise be possible while in cutting position. The only appreciable motion about a vertical axis of the forward cutting unit takes place when the cutting units are being moved to and from a non-operating position. Once they have been moved to cutting position, there is very little movement about a vertical axis which can take place with the draw bars consisting of the mounting arm 17 and the bracket 18 and 19.

It will also be noted that the unique connection between my gang mower assembly and the tractor is such as to control the movement of the forward mowers while cutting and to support them during transport entirely from the hitch arms on the rear of the tractor through the rear portion of my frame and its cantilever side booms as represented by the legs 6b and 6c.

From the above it can be seen that I have provided a unique and highly improved gang mower assembly which may be easily and quickly attached and detached to the frame of a tractor by merely utilizing the three point hitch thereof. In addition, it will be noted that I have provided a unique gang mower assembly capable of being utilized in combination with a low silhouette type tractor commonly referred to as a utility tractor. Through the use of my assembly, any organization owning a utility type tractor may now utilize the same tractor for operating a gang mower assembly and can thereby avoid the expense of purchasing a tractor of the higher silhouette type in addition to the one which it already owns.

It will, of course, be understood that various changes may be made in the form, details, arrangement and proportions of the various parts without departing from the scope of my invention.

What is claimed is:

1. A mowing assembly for use on a tractor comprising, a generally U-shaped frame constructed and arranged to be connected to a tractor having rear wheels, said frame having a base portion extending transversely of and behind the tractor and two leg portions one each of which extends forwardly from said base portion along opposite sides of the tractor when so connected to the tractor, said leg portions being swingably connected to said base portion to permit said leg portions to swing laterally outwardly from the tractor about an upright axis disposed rearwardly of the axis of rotation of the rear wheels of the tractor when said frame is so connected thereto to facilitate connection and disconnection of the frame with the tractor, and a pair of mowing units one each of which is connected with one of said leg portions, and is disposed ahead of a rear wheel of the tractor when said frame is connected thereto and is swingable laterally outwardly with its respective leg portion from a position ahead of its associated rear wheel of the tractor to facilitate disconnection of said frame from the tractor.

2. A mowing apparatus comprising, a tractor having front and rear wheels, a generally U-shaped frame removably mounted on said tractor and having a base portion extending transversely thereof and therebehind and two leg portions one each of which extends forwardly from said base portion along opposite sides of said tractor, and a pair of mowing units one each of which is connected with one of said leg portions and is disposed adjacent a rear wheel of said tractor, said mowing units being disposed in front of said rear wheels and a substantial distance behind the front wheels of said tractor and being swingable in opposite directions laterally outwardly relative to said tractor about an upright axis disposed rearwardly of the forwardmost portions of the rear wheels of said tractor to facilitate the removal of said frame from said tractor.

3. A mowing assembly for use on a tractor comprising, a generally U-shaped frame constructed and arranged to be connected to a tractor having rear wheels and a hydraulic lift thereon, said frame having a base portion extending transversely of and behind the tractor and two legs one each of which extends forwardly from said base portion along opposite sides of the tractor when so connected to the tractor, said legs having mowing unit carrying portions swingable laterally outwardly from the tractor about a vertical axis disposed rearwardly of the rear wheels of the tractor when said frame is so connected thereto to facilitate connection and disconnection of the frame with the tractor, and a pair of mowing units one each of which is connected with one of said swingable leg portions and is entirely disposed ahead of a rear wheel of the tractor when said frame is so connected and is swingable laterally outwardly with its respective leg portion from a position ahead of its associated rear wheel of the tractor to facilitate disconnection of said frame from the tractor.

4. The structure defined in claim 3, and a third mowing unit connected to said base portion and normally overlapping the path of cut of said pair of mowing units when said frame is so connected.

5. The structure defined in claim 3, and power transmitting mechanism carried by said frame and connected with each of said mowing units and constructed and arranged to be connected in driven relation to a power take-off of such a tractor.

6. The structure defined in claim 3, and means for connecting said frame to the hydraulic lift of such a tractor in solely supported relation whereby said frame and said mowing units may be elevated or lowered into contact with the ground by the hydraulic lift as desired.

7. A mowing apparatus comprising, a generally U-shaped frame constructed and arranged to be connected to a tractor having rear wheels and a hydraulic lift thereon, said frame having a base portion extending transversely of and behind the tractor and having two legs, one each of which extends forwardly from said base portion along opposite sides of the tractor when so connected to the tractor, said legs having mowing unit carrying portions swingable laterally outwardly from the tractor about an axis disposed rearwardly of the forwardmost portions of the rear wheels of the tractor when said frame is so connected thereto to facilitate connection and disconnection of the frame with the tractor, a pair of mowing units, one each of which is connected with one of said swingable leg portions and is swingable laterally outwardly therewith, and power transmitting mechanism carried by said frame and connected with each of said mowing units in power transmitting relation, such mechanism being constructed and arranged to be connected in driven relation to a powered take-off of such a tractor.

8. A mowing apparatus comprising a tractor having rear wheels and a hydraulic lift thereon, a generally U-shaped frame mounted on said tractor and having a base portion extending transversely thereof and therebehind and two legs one each of which extends forwardly from said base portions along opposite sides of said tractor, the lift of said tractor being detachably connected to said frame in solely supporting relation to elevate and lower the same as desired, each of said legs having mowing units carrying portions swingable laterally outwardly from the tractor about an axis disposed rearwardly of the axis of rotation of the wheels of said tractor to facilitate connection and disconnection of the frame with the tractor, a pair of mowing units one each of which is movably mounted on the mowing unit carrying portion of each of said legs and is movable longitudinally of said leg, said mowing units being disposed in front of said rear wheels of said tractor and being swingable in opposite directions laterally outwardly relative to said tractor to facilitate removal of said frame from said tractor, and shifting mechanism mounted on said frame and connecting said mowing units to the hydraulic lift of said tractor, said shifting mechanism being arranged in controlled relation with the hydraulic lift of said tractor to cause said mowing units to shift longitudinally of said leg portions as said hydraulic lift elevates and lowers said frame.

9. A mowing apparatus comprising, a tractor having rear wheels and a three point hitch, a generally U-shaped frame removably connected to said tractor by said three point hitch and supported solely thereby and having a base portion extending transversely thereof and behind said tractor and two leg portions one each of which extends forwardly from said base portion along opposite sides of said tractor, and a pair of mowing units one of which is connected with one of said leg portions and is disposed ahead of a rear wheel of said tractor, said mowing units being swingable in opposite directions laterally outwardly relative to said tractor to facilitate the removal of said frame from said tractor, the sole supporting means for said frame and said mowing units by said tractor being the three point hitch of said tractor whereby said frame and said mowing units may be lowered and raised at will by the operator of the tractor.

10. A mowing apparatus comprising, a tractor having rear wheels, a generally U-shaped frame removably mounted on said tractor and having a base portion extending transversely thereof and therebehind and two legs one each of which extends forwardly from said base portion along opposite sides of said tractor, said legs having mowing unit carrying portions swingable laterally outwardly from the tractor about an axis disposed rearwardly of the axis of rotation of the rear wheels of said tractor to facilitate connection and disconnection of said frame with the tractor, said leg portion normally extending parallel to the longitudinal axis of said tractor, and a pair of mowing units one each of which is connected to one of said leg portions and is disposed ahead of one of the rear wheels of said tractor and extending into the vertical confines of the outline thereof and being swingable with said leg portion in opposite directions laterally outwardly relative to said tractor to facilitate the removal of said frame from said tractor.

11. A mowing apparatus comprising, a tractor having rear wheels and a hydraulic lift, a generally U-shaped frame removably mounted on said tractor and connected in solely supported relation with the lift thereof for elevation and lowering thereby and having a base portion extending transversely thereof and therebehind and having two leg portions one each of which extends forwardly from said base portion along opposite sides of said tractor, and a pair of mowing units one each of which is connected with one of said leg portions and is disposed ahead of one rear wheel of said tractor and extends into the vertical confines of the outlines of said tractor, each of said mowing units being supported by said frame in elevated position when said frame is elevated by the hydraulic lift of said tractor and being swingable in opposite directions laterally outwardly relative to said tractor about an axis disposed at one end of said transverse portion to facilitate the removal of said frame from said tractor.

12. A mowing assembly for use on a tractor having a power take-offcomprising, a generally U-shaped frame constructed and arranged to be mounted on a tractor, said frame having a base portion extending transversely of and behind the tractor and two leg portions one each of which extends forwardly from said base portion along opposite sides of the tractor when said frame is so mounted on the tractor, a pair of mowing units one each of which is supported and propelled by one of said leg portions and is disposed ahead of a rear wheel of the tractor when said frame is mounted thereon, and rotary drive mechanism carried by said base portion of said frame and extending forwardly and being connected in driving relation to each of said mowing units, said drive mechanism being constructed and arranged for connection to the power take-off of such a tractor in driven relation thereto to transmit driving power to each of said mowing units.

13. A mowing apparatus comprising, a generally U-shaped frame constructed and arranged to be mounted on a tractor having rear wheels and a hydraulic lift thereon, said frame having a base portion extending transversely of and behind the tractor and having two legs one each of which extends forwardly from said base portion along opposite sides of the tractor when so mounted on the tractor, said base portion being adapted to be connected to the hydraulic lift of such a tractor in supportted relation for raising and lowering thereof by the hitch, said legs having mowing unit carrying portions swingable laterally outwardly from the tractor to facilitate connection and disconnection of said frame with the tractor, a pair of mowing units one each of which is connected with one of said swingable leg portions and is swingable laterally outwardly therewith, and shift mechanism connected with each of said mowing units and constructed and arranged to be connected to the hydraulic lift of such a tractor in actuate derelation, said mechanism being so constructde and arranged as to cause said mowing units to shift forwardly when said frame is lifted by the hydraulic lift of the tractor and to cause said units to shift rearwardly when said frame is lowered by the hydraulic lift of such a tractor.

14. A mowing apparatus comprising a tractor having front and rear wheels and a hydraulic lift thereon, a generally U-shaped frame removably mounted on said tractor and having a base portion extending transversely thereof and therebehind and two legs one each of which extends forwardly from said base portion along opposite sides of said tractor, three overlapping mowing units, said frame being connected to said mowing units in supporting relation, mechanism connecting said base portion to the three point hitch of said tractor in supported relation for raising and lowering of said frame and said mowing units thereby, and shifting mechanism carried by said frame and connected to the three point hitch of said tractor in actuated relation and being connected to each of said mowing units in actuating relation, said mechanism being constructed and arranged to cause said mowing units to shift away from said tractor when said frame is elevated by the three point hitch of said tractor so that no part of said mowing units or said supporting frame interferes with any part of said tractor and to shift towards said tractor when said frame is lowered by the three point hitch of said tractor.

15. A mowing apparatus comprising, a generally U-shaped frame constructed and arranged to be mounted on a tractor having rear wheels and a hydraulic lift thereon, said frame having a base portion extending transversely of and behind the tractor and having two legs, one each of which extends forwardly from said base portions along opposite sides of the tractor when so mounted on the tractor, said base portion being adapted to be connected to the hydraulic lift of such a tractor in supported relation for raising and lowering thereof by the hitch, said legs having mowing unit carrying portions swingable laterally outwardly from the tractor to facilitate connection and disconnection of said frame with the tractor, a pair of mowing units one each of which is connected with one of said swingable leg portions and is swingable laterally outwardly therefrom, and shift mechanism connected with each of said mowing units and constructed and arranged to be connected to the hydraulic lift of such a tractor in actuated relation, said mechanism being so constructed and arranged as to cause said mowing units to shift outwardly when said frame is lifted by the hydraulic lift of the tractor and to cause said units to shift inwardly when said frame is lowered by the hydraulic lift of such a tractor.

References Cited in the file of this patent

UNITED STATES PATENTS

| | | |
|---|---|---|
| 2,285,306 | Roseman | June 2, 1942 |
| 2,371,822 | Hyman | Mar. 20, 1945 |
| 2,849,850 | O'Donnell et al. | Sept. 2, 1958 |